W. H. SMITH.
DIES AND MOLDS FOR MOLDING PLASTIC MATERIALS.
No. 180,384. Patented July 25, 1876.
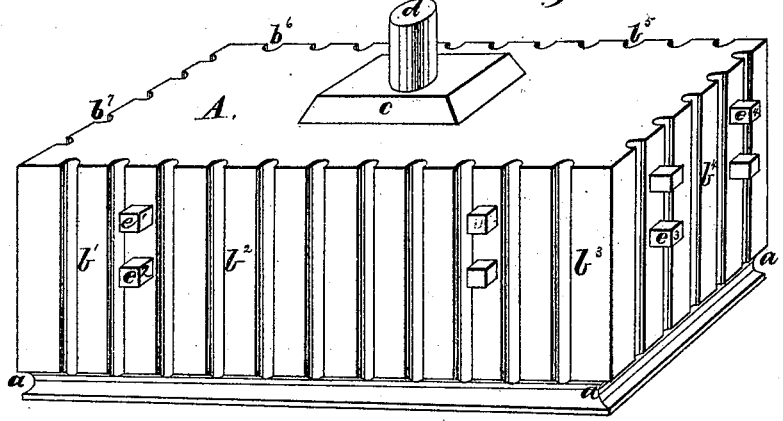
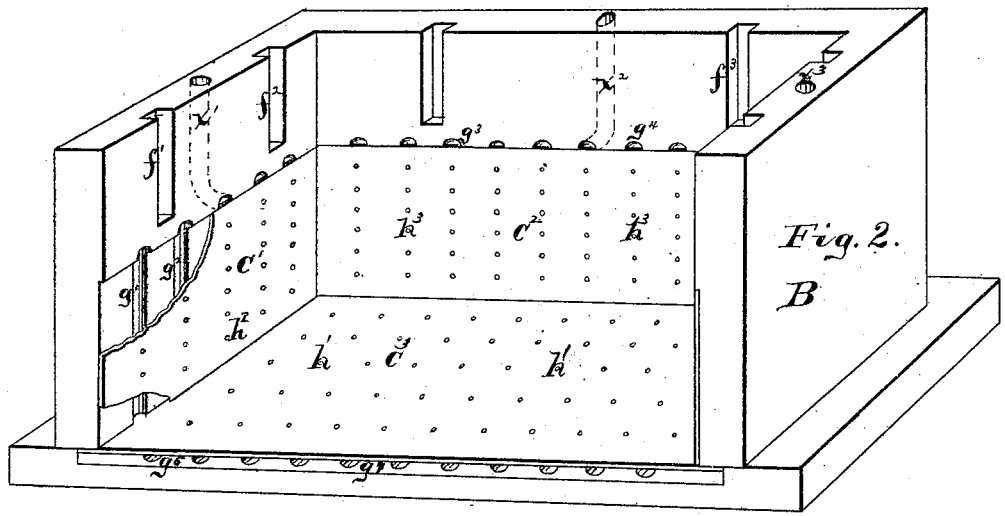
Witnesses
Theo. P. Matthews.
Thomas A. Porter
Inventor
W. Harold Smith

UNITED STATES PATENT OFFICE.

W. HARROLD SMITH, OF PHILADELPHIA, PENNSYLVANIA.

IMPROVEMENT IN DIES AND MOLDS FOR MOLDING PLASTIC MATERIAL.

Specification forming part of Letters Patent No. 180,384, dated July 25, 1876; application filed November 29, 1875.

*To all whom it may concern:*

Be it known that I, W. HARROLD SMITH, of the city and county of Philadelphia, and State of Pennsylvania, have invented certain Improvements in Dies and Molds for Molding Plastic Materials, of which the following is a specification:

The object and purpose of my invention is to provide for the thorough and rapid escape of the air compressed within the mold during the operation of molding, and also to prevent the rebound of the die, and secure an even distribution of the effect when percussive force is employed. To accomplish this purpose I construct a die and mold of the following description, which will be best understood by reference to the accompanying drawings, of which—

Figure 1 shows the die isometrically drawn; and Fig. 2, the mold with its front removed, so as to show the interior, also in isometric drawing. Fig. 3 is a transverse section through the center of a special form of bed-plate designed for molding in relief; and Fig. 4 gives an enlarged view in section of a portion of one of the perforated plates of the molds, showing the shape of the perforations therein.

Corresponding parts are indicated by the same letters throughout.

A, Fig. 1, is the die. $a\,a$ is a groove or air-chamber running continuously around the body of the die close to its lower edges. The strip remaining on each face, between this chamber $a\,a$ and the lower edge, is trimmed off about the thirty-second of an inch all round. $b^1$, $b^2$, $b^3$, &c., are other grooves or channels running from $a\,a$ to the top of the die. $c$ is a socket, in which the pin $d$ is so secured that it may readily be removed, if required. $e^1$, $e^2$, $e^3$, &c., are guide-pins working in guide-slots $f^1\,f^2\,f^3$ on the mold. In a modified form (not shown in the drawings) the under surface of the die is chambered in a manner similar to the sides of the mold about to be described, and then faced with a perforated plate similar to $C^1$, &c., as described below. B, Fig. 2, is the mold, with its front and a small portion of its sides and bottom removed to show the interior. $g^1$, $g^2$, $g^2$, &c., are air-chambers constructed in the sides and bottom of the mold. These chambers may also extend to the top of the mold, as indicated by the dotted lines at $x^1$, $x^2$, $x^3$, &c. $C^1\,C^2\,C^3$ are thin plates of metal set with their outer faces flush with the inner faces of the mold, and perforated with small openings to allow the escape of air from inside the mold into the air-chambers $g^1$, $g^2$, $g^3$, &c. These perforations $h^1$, $h^2$, $h^3$, &c., are made in the shape of truncated cones, as shown in Fig. 4, with their smaller diameters in the outer face of the plates.

This construction operates as follows: The mold being filled to the proper height with the material to be worked, the die is introduced into the mold, the opening of which the body of the die fits with mathematical accuracy; but its lower edge nowhere approaches nearer than the thirty-second of an inch to the sides of the mold, so that a narrow passage is left all around the under face of the die, through which the air in the mold beneath the die can escape into the air-chamber $a\,a$, and so through the channels $b^1$, $b^2$, $b^3$, &c., into the open air. As the die descends, (whether forced down by press or driven down by hammer is immaterial,) the air in the substance operated on is driven to the sides and bottom of the mold, and escapes through the minute perforations in the plates $C^1\,C^2$ into the air-chambers $g^1\,g^2\,g^3$, and through the upper open portions of these over the top of the plates $C^1\,C^2$ into the channels $b^1$, $b^2$, $b^3$, &c., in the die, which are so constructed as to be opposite those openings, and so into the surrounding atmosphere. The air may also escape more directly by openings extending from $g^1$, $g^2$, &c., through the walls and bottom of the mold to the exterior, if preferred. In case any of the plastic material should be forced into the openings it will have nothing to adhere to, in consequence of the conical shape of the perforations, but will be dislodged by the jar of the apparatus while molding, and will fall into the air-chambers, whence it can be easily removed by scrapers, brushes, or other convenient means. The guide-pins $e^1\,e^2$ and slots $f^1\,f^2$ simply serve to keep the die to its true level, and may be dispensed with without effecting the result described. When molding in relief, a modification in the mold becomes necessary. The figure in relief is constructed in the bed-plate of the mold, (see Fig. 3, which represents a section through the center of such a plate,) and the air-chambers $g^1$ $g^2$ $g^3$ are made in the back of the plate itself, conforming to the outline of the figure and the perforations opened into them wherever convenient.

If the die is to be driven home by percussion, I use the pin $d$, of soft steel or other suitable metal, erected in a socket, $c$, in the exact center of the top of the die, and maintained in a true perpendicular by guides, (not shown in the drawings,) on which pin the blow of the hammer is delivered. By this device rebound of the die is not only prevented, but the distribution of the effect is more uniform than if the die were struck directly. This pin or bar $d$ may be of any length or shape, in a single piece or jointed, &c. It is not used when molding by pressure. The die may also be used in connection with an ordinary mold. Its shape is, of course, immaterial, as are also the shape, or number, or modes, or materials of construction of the air-chambers in the mold described above.

I claim—

1. The die A, having grooves $b^1$, $b^2$, $b^3$, &c., in the sides, and air-chamber $a$ at the lower edge, in combination with the passage formed by trimming off the edges of the lower face of the die, as set forth.

2. The combination of the die A and the operating hammer with the pin $d$, of soft metal, interposed between the two to receive the percussive force of the blow, as set forth.

W. HARROLD SMITH.

Witnesses:
THEO. P. MATTHEWS,
THOMAS A. PORTER.